US012757041B2

(12) United States Patent
Youtz et al.

(10) Patent No.: US 12,757,041 B2
(45) Date of Patent: Oct. 6, 2026

(54) SYSTEMS AND METHODS FOR NETWORK SIGNALING OF COVERAGE TYPES

(71) Applicant: Verizon Patent and Licensing Inc., Basking Ridge, NJ (US)

(72) Inventors: Andrew E. Youtz, Princeton, NJ (US); Brian T. Mecum, Aliso Viejo, CA (US); Balaji L. Raghavachari, Bridgewater, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 818 days.

(21) Appl. No.: 18/049,766

(22) Filed: Oct. 26, 2022

(65) Prior Publication Data

US 2024/0147269 A1 May 2, 2024

(51) Int. Cl.
*H04W 24/08* (2009.01)
*H04W 48/10* (2009.01)

(52) U.S. Cl.
CPC ........... *H04W 24/08* (2013.01); *H04W 48/10* (2013.01)

(58) Field of Classification Search
CPC ...... H04W 24/08; H04W 48/10; H04W 48/12
See application file for complete search history.

(56) References Cited

U.S. PATENT DOCUMENTS 11,902,862 B2 * 2/2024 Humbert ................. H04W 4/18
11,903,060 B2 * 2/2024 Zhang ................... H04W 76/11
12,192,794 B2 * 1/2025 Khanka ................. H04W 24/02
12,425,508 B2 * 9/2025 Zhu ....................... H04W 36/18
2012/0164979 A1 * 6/2012 Bachmann .......... H04W 12/062 455/411
2015/0304162 A1 * 10/2015 Wang .................. H04L 41/0803 370/254
2019/0260126 A1 * 8/2019 Ayala ................... H01Q 9/0485
2020/0037387 A1 * 1/2020 Lee ....................... H04W 48/16
2020/0076518 A1 * 3/2020 Patel ................... H04W 64/003
2020/0106815 A1 * 4/2020 Wang .................... H04L 65/764
2021/0075901 A1 * 3/2021 Ahluwalia ............ H04M 1/724
2021/0250846 A1 * 8/2021 Ohlsson ................ H04W 48/02
2021/0352574 A1 * 11/2021 Ramamurthi ....... H04L 12/1407
2021/0410205 A1 * 12/2021 Babu ..................... H04W 76/38
2022/0124609 A1 * 4/2022 Asthana ................. G06N 20/00
2022/0217519 A1 * 7/2022 Kim ........................ H04L 69/40
2022/0353744 A1 * 11/2022 Shen ..................... H04W 48/16
2023/0051473 A1 * 2/2023 Wallace .................. H04W 8/24
2023/0057250 A1 * 2/2023 Jia ......................... H04M 1/724
2023/0135450 A1 * 5/2023 Huang ............. H04M 1/72469 455/435.1
2023/0308250 A1 * 9/2023 Wu ....................... H04W 48/16

* cited by examiner

*Primary Examiner* — Kevin T Bates

(57) ABSTRACT

Systems and methods described herein improve a customer experience by enabling a user equipment (UE) device to accurately display a premium network icon based on network signaling. A network device stores configuration thresholds for supporting a premium cellular service and monitors network conditions against the configuration thresholds. When the network conditions meet at least one of the configuration thresholds, the network device provides to the UE device a signal for the UE device to present a premium network icon to a user.

20 Claims, 12 Drawing Sheets

| Rule | Network Signaling | Associated 5G Premium Service Criteria | UE Behavior |
|---|---|---|---|
| 1 | Dummy PLMN ID A | 5G Premium Service Support (no band criteria) | UE displays 5G Premium Icon regardless of band support |
| 2 | Dummy PLMN ID X | 5G Premium Service Support for mid-band (n77) | UE displays 5G Premium Icon if it supports n77 band |
| 3 | Dummy PLMN ID Y | 5G Premium Service Support for high-band (mmWave) | UE displays 5G Premium Icon if it support mmWave band(s) |
| 4 | Dummy PLMN ID Z | 5G Premium Service Support for mid-band (n77) and high-band (mmWave) | UE displays 5G Premium Icon if it supports n77 or mmWave bands |
| 5 | Dummy PLMN ID X<br>TAC 0<br>TAC 1 | 5G Premium Service Support for mid-band (n77)<br>Also support for high-band (mmWave)<br>Also support mid-band (n48) | UE displays 5G Premium Icon if it:<br>supports n77 band, or<br>supports mmWave, or<br>supports n48 band and n48 CA |

600

690

| Rule | Network Signaling | Associated 5G Premium Service Criteria | UE Behavior |
|---|---|---|---|
| 1 | Dummy PLMN ID A | 5G Premium Service Support (no band criteria) | UE displays 5G Premium Icon regardless of band support |
| 2 | Dummy PLMN ID X | 5G Premium Service Support for mid-band (n77) | UE displays 5G Premium Icon if it supports n77 band |
| 3 | Dummy PLMN ID Y | 5G Premium Service Support for high-band (mmWave) | UE displays 5G Premium Icon if it support mmWave band(s) |
| 4 | Dummy PLMN ID Z | 5G Premium Service Support for mid-band (n77) and high-band (mmWave) | UE displays 5G Premium Icon if it supports n77 or mmWave bands |
| 5 | Dummy PLMN ID X<br>TAC 0<br>TAC 1 | 5G Premium Service Support for mid-band (n77)<br>Also support for high-band (mmWave)<br>Also support mid-band (n48) | UE displays 5G Premium Icon if it:<br>supports n77 band, or<br>supports mmWave, or<br>supports n48 band and n48 CA |

⋮

610 615 620 625

FIG. 6

700

| Parameter | Threshold |
| --- | --- |
| Band | Minimum band support for 5G Premium (e.g., n77, mmWave, n48, FDD, NULL) |
| Bandwidth | Minimum bandwidth (e.g., *x* MHz for Band *y*, NULL) |
| MIMO Layers | Number of MIMO layers (e.g., *z* layers for Band *y*, total of *w* layers across all 5G premium service bands, NULL) |
| CA/DC Support | Minimum CA/DC support (e.g., combinations v1, v2, …, vn, NULL) |
| Network Loading | Network loading that still allows 5G premium user experience (e.g., maximum loading % for 5G Premium, minimum peak throughput/device for 5G Premium, NULL) |
| Network Backhaul (BH) | Minimum eNB/gNB backhaul (e.g., BH Gbps, NULL) |

790

710 ⋮ 720

FIG. 7

SYSTEMS AND METHODS FOR NETWORK SIGNALING OF COVERAGE TYPES

BACKGROUND

Next Generation mobile networks, such as Fifth Generation (5G) mobile networks, are being deployed as the next evolution of mobile wireless networks. 5G mobile networks are designed to increase data transfer rates, increase spectral efficiency, improve coverage, improve capacity, and reduce latency. Under the general classification of "5G," mobile networks may use different radio frequency bands with different capabilities. For example, mid-band and-high band 5G service (referred to herein as "5G premium service") can provide greater data-transfer speeds than low-band 5G service. As 5G networks are being deployed and evolving, user devices may be configured to support 5G premium service, 5G low-band service, and/or legacy networks, such as 4G/Long Term Evolution (LTE) service. Cells for 5G premium service, 5G low-band service, and LTE service may have different and/or overlapping coverage areas.

BRIEF DESCRIPTION OF THE DRAWINGS

FIG. 6 is a diagram of a table that illustrates example 5G premium icon display rules;

FIG. 7 is a diagram of a table that illustrates example configuration thresholds for 5G premium icon signaling;

DETAILED DESCRIPTION OF EXAMPLE EMBODIMENTS

Figure 1:
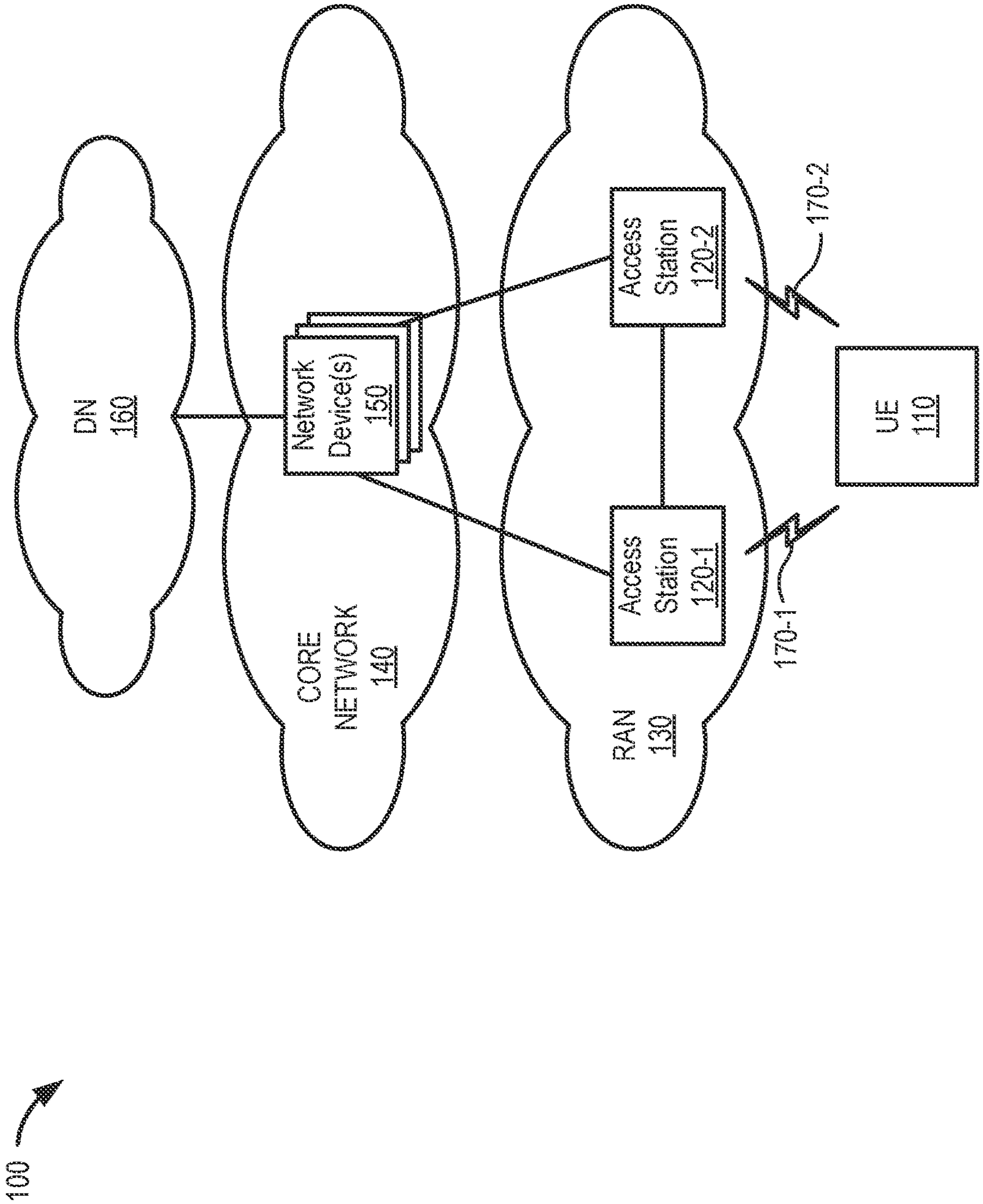
FIG. 1 is a diagram illustrating a network environment in which systems and methods described herein may be implemented.

The following detailed description refers to the accompanying drawings. The same reference numbers in different drawings may identify the same or similar elements. Also, the following detailed description does not limit the invention.

Fifth Generation (5G) wireless service may include certain categories of radio frequency bands, such as high-band (e.g., above 6 Gigahertz (GHz), also referred to as mmWave), mid-band (e.g., between 3 GHz and 6 GHz), and low-band (e.g., below 3 GHz), although different categories and terminology may be used. Generally, low-band 5G service provides widespread signal coverage. Mid-band and high-band 5G service (collectively referred to herein as "5G premium service" and also known as Ultra-Wideband (UW) service) can provide faster data transfer speeds than low-band 5G service, but with less signal range than low-band 5G service.

Mobile networks typically have multiple radio access types (RATs) and multiple layers with capabilities that can vary from cell to cell. User equipment (UE) devices typically display an icon (referred to herein as a "network icon") that indicates to a user the current type of network service available. For example, the UE device may display a 5G premium network icon when connected to a wireless network that provides 5G premium service and a 5G standard network icon when connection to a wireless network that provides low-band 5G service. However, the UE device typically has limited information to determine whether to display the 5G premium network icon or the 5G standard network icon. For example, the UE device is only able to measure channels it is active on.

Currently, decisions for displaying a network icon are made by a UE device based on measured connection data. For example, a UE device may display the 5G premium network icon when it detects an active 5G connection using mid-band or high-band frequencies. Although displaying the 5G premium network icon may accurately reflect the type of network service for an active network connection, network icons are typically perceived by users as an indicator of network coverage even when the UE device does not have an active connection. For example, when not actively transmitting and/or receiving data, the UE device in 5G non-standalone (NSA) architectures will typically default to listen over a legacy (4G or Long-Term Evolution (LTE)) service. Alternatively, when in a 5G standalone (SA) environment, the UE device could listen over either a low-band 5G service or a mid-band 5G service. Thus, there is currently no way for the UE device to guarantee 5G premium service availability when the UE device is in idle mode. The UE device can currently only estimate/predict 5G premium service availability when idle.

In contrast with the UE device, the mobile network is consistently aware of its capabilities and coverage areas. According to implementations described herein, communications from a serving cell of the mobile network (e.g., a wireless access station or base station that supports 5G premium service) can be used to instruct whether a UE device should display a 5G premium network icon. Network signals (referred to as "premium icon signaling") may be in the form of broadcast messages for all UE devices in a cell or direct signals to individual UE devices.

The premium icon signaling may be static or may be dynamically adjusted based on network conditions (e.g., the currently ability of a cell to support 5G premium service). Furthermore, the premium network icon signaling may work in conjunction with rules stored by UE devices to appropriately display a 5G premium network icon. As described further herein, wireless access stations may receive a common configuration and/or parameters for the premium icon signaling that can be tuned (or self-configured) by each access station based on the access station's 5G capabilities.

Thus, systems and methods described herein improve a customer experience by enabling a UE device to accurately display a 5G premium network icon based on network signaling. According to an implementation, a network device stores configuration thresholds for supporting a premium cellular service by the network device and monitors network conditions against the configuration thresholds. When the network conditions meet the configuration thresholds, the network device provides to the UE device a signal for the UE device to present a premium network icon to a user. In one aspect, the signal may be broadcast via a system information block (SIB). In another aspect, the signal may be a direct signal via a radio resource control (RRC) message.

FIG. 1 is a diagram of an example environment 100 in which the systems and/or methods, described herein, may be implemented. Referring to FIG. 1, environment 100 includes UE device 110, wireless access stations 120-1 and 120-2 (referred to collectively as access stations 120 and generically as access station 120) associated with a radio access network (RAN) 130, a core network 140 with network devices 150, and a data network (DN) 160. In other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are examples.

In the configuration of FIG. 1, UE device 110 may use wireless channels 170-1 and 170-2 (referred to collectively as wireless channels 170) to communicate with access stations 120-1 and 120-2, respectively. Wireless channels 170 may correspond, for example, to physical layer protocols in accordance with different radio access technology (RAT) types. For example, wireless channel 170-1 may correspond to physical layer protocols for 5G low-band service (e.g., 3GPP standards for 5G air interfaces using a low-band radio frequency), while wireless channel 170-2 may correspond to physical layer protocols for 5G premium service (e.g., 3GPP standards for 5G air interfaces using mid-band or high-band radio frequencies).

UE device 110 may include any type of mobile device having coverage mode capabilities for 5G low-band service and 5G premium service. UE device 110 may thus communicate with different access stations (e.g., access stations 120) using different wireless channels (e.g., channels 170) corresponding to the different 5G services. UE device 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities. In other implementations, UE device 110 may be implemented as a machine-type communications (MTC) device, an Internet of Things (IoT) device, a machine-to-machine (M2M) device, etc. According to implementations described herein, UE device 110 may be provisioned to recognize specific signals (e.g., Public Land Mobile Network identifiers (PLMN IDs), SIB information elements (IEs), RRC messages, etc.) from access stations 120 that indicate instructions or criteria for displaying 5G premium network icons. UE device 110 may support wireless communications using 4.5G, 4G, LTE, and other air interfaces. Additionally, UE device 110 may support simultaneous carrier aggregation of different RAT types (e.g., 4G, 5G low-band, 5G premium, etc.).

RAN 130 may enable end devices (e.g., UE devices 110) to connect to core network 140 for mobile telephone service, Short Message Service (SMS), Multimedia Message Service (MMS), Internet access, cloud computing, and/or other types of data services. RAN 130 may include access stations 120 that service UE devices 110 within a geographic area. Access station 120 may include a 5G base station (e.g., a gNodeB or gNB) that includes one or more radio frequency (RF) transceivers configured to send and receive 5G New Radio (NR) wireless signals. According to an implementation, access station 120 may include a gNB or its equivalent with multiple distributed components, such as a virtualized central unit (vCU), a virtualized distributed unit (vDU), a remote unit (RU), or a remote radio unit (RRU), or another type of component to support distributed arrangements. In other implementations, access station 120 may include a 4G base station (e.g., an eNodeB or eNB) in combination with a 5G base station. Furthermore, in some implementations, access station 120 may include a Multi-Access Edge Computing (MEC) system that performs cloud computing and/or provides network processing services for UE devices 110. One or more of access stations 120 may support multiple RAT types. For example, access stations 120 may be configured to support communications via two or more of low-band, mid-band, or high-band frequencies.

Core network 140 may include one or multiple networks of one or multiple types. For example, core network 140 may include a terrestrial network and/or a satellite network. According to an implementation, core network 140 includes a network pertaining to RAN 130. For example, core network 140 may include the core part of a 5G network, an LTE network, an LTE-A network, a legacy network, and so forth.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), as well other network elements pertaining to various network-related functions, such as billing, security, authentication and authorization, network polices, subscriber profiles, network slicing, and/or other network elements that facilitate the operation of core network 140.

DN 160 may include one or more networks, such as a local area network (LAN), a wide area network (WAN), a metropolitan area network (MAN), a telephone network, the Internet, etc., capable of communicating with UE device 110. In one implementation, DN 160 includes a network that provides data services (e.g., via packets or any other Internet protocol (IP) datagrams) to UE device 110.

The number and arrangement of devices in environment 100 are examples. According to other embodiments, environment 100 may include additional devices and/or differently arranged devices, than those illustrated in FIG. 1.

Figure 2A:
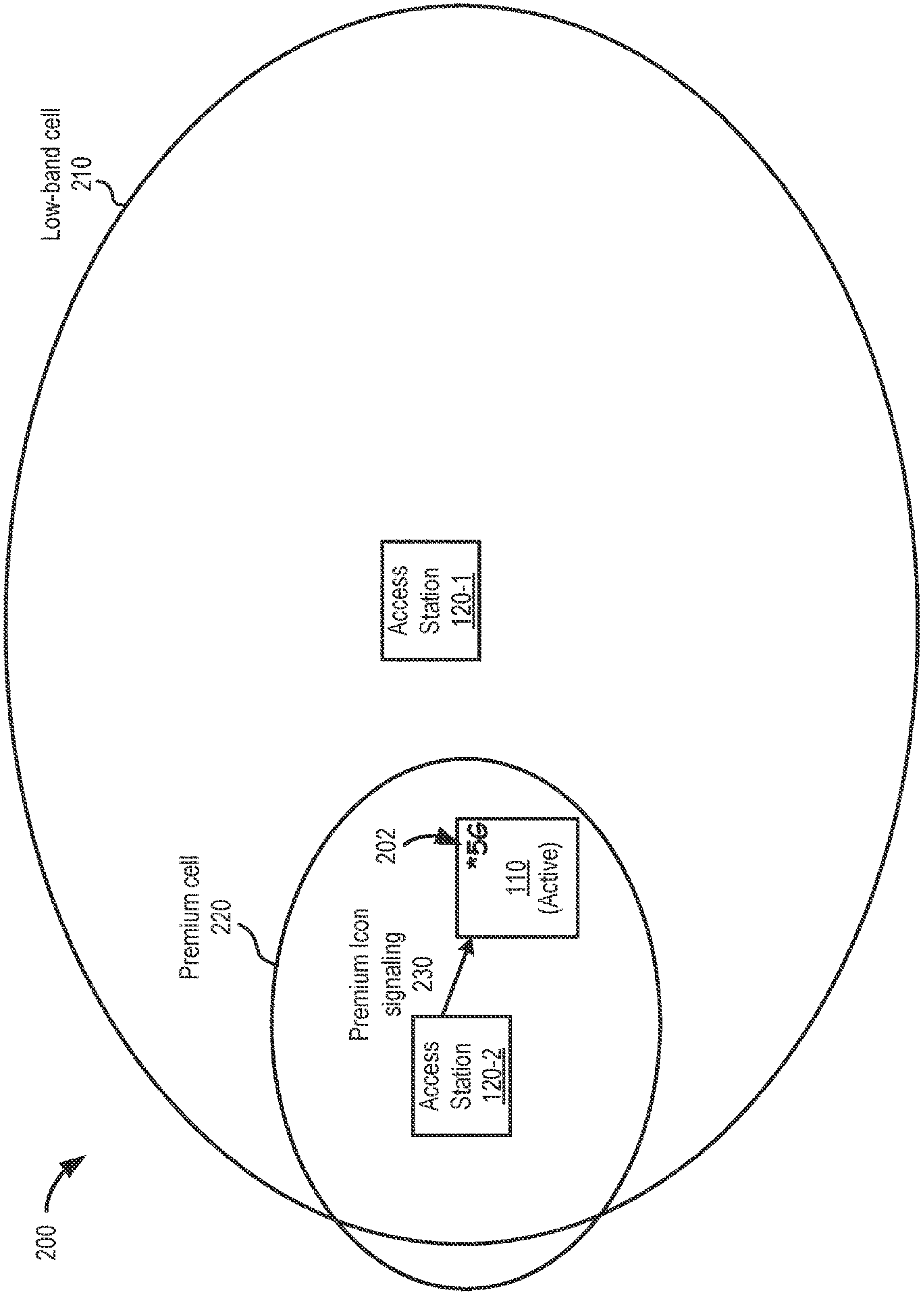
FIGS. 2A-2C are diagrams illustrating concepts described herein.
Figure 2B:
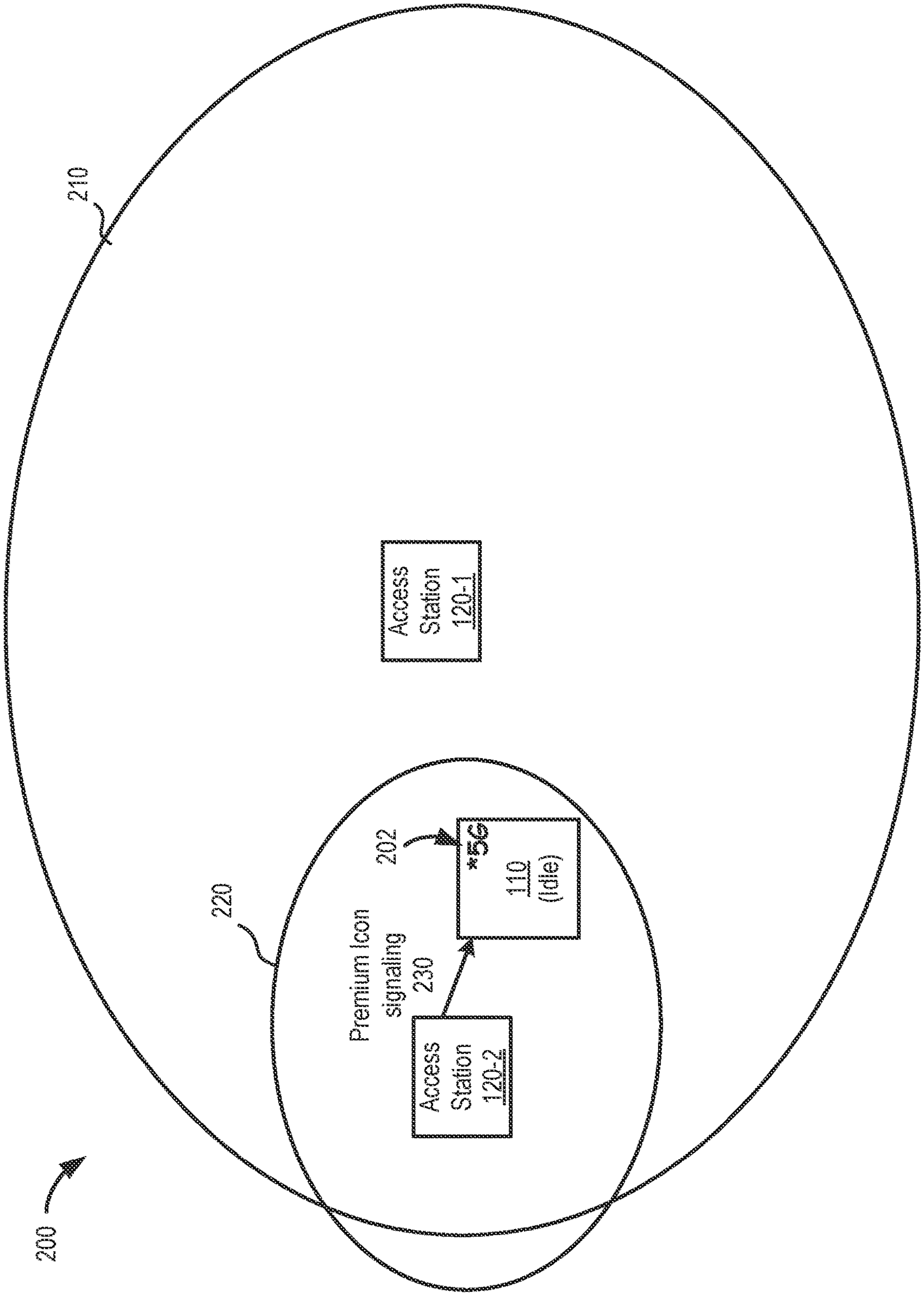
Figure 2C:
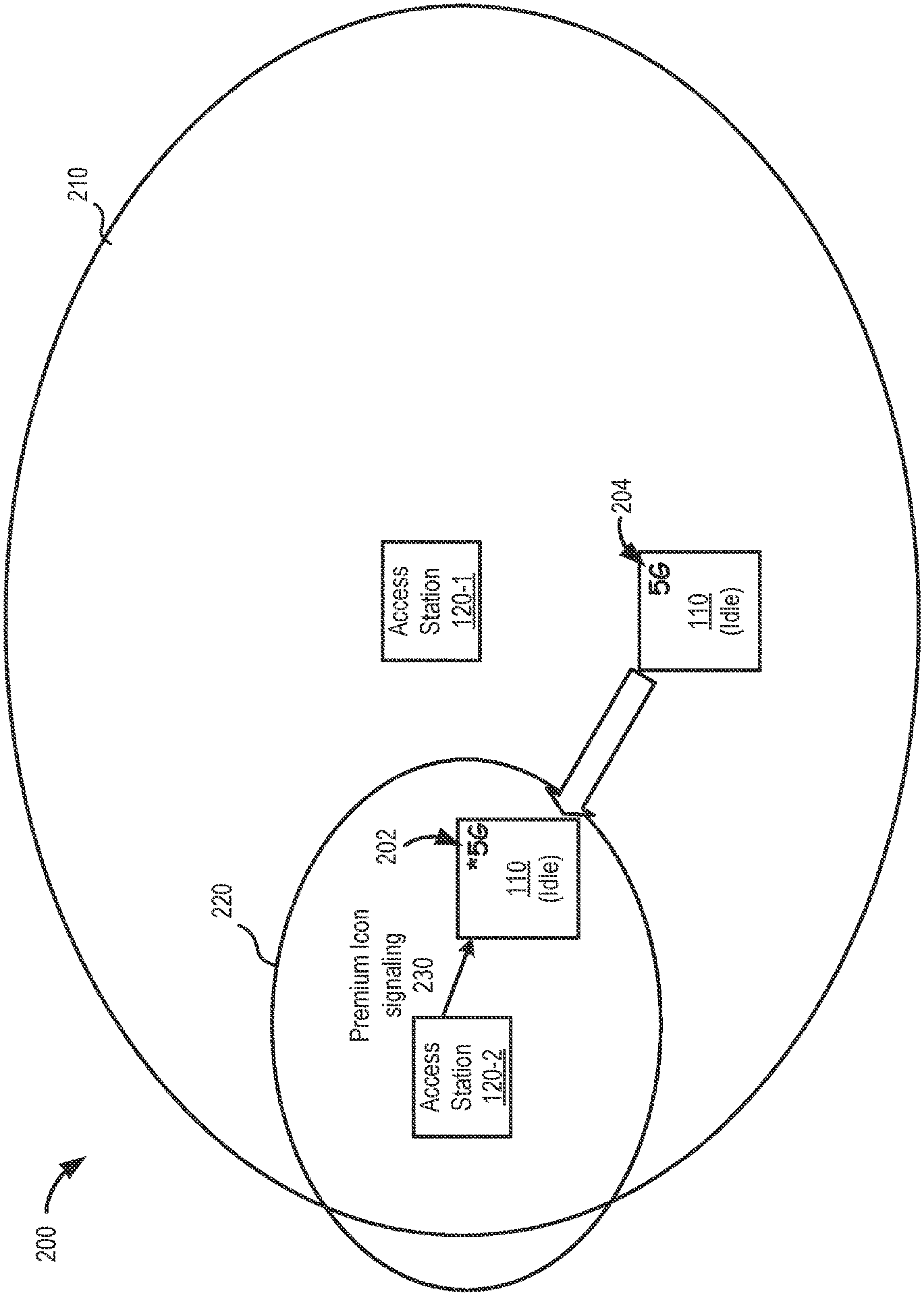

FIGS. 2A-2C illustrate concepts described herein. FIGS. 2A-2C illustrate cell coverage in an area 200 of environment 100. Referring collectively to FIGS. 2A-2C, area 200 includes a 5G low-band cell 210 overlapping a 5G premium cell 220. Each of cells 210 and 220 may correspond to a particular coverage area supported by a particular access station 120. More particularly, cell 210 may correspond to access station 120-1, and cell 220 may correspond to access station 120-2. Assume that cell 210 is a 5G cell having a relatively large coverage area supporting 5G communication devices that operate in a certain low-band frequency. Further, assume that cell 220 is a 5G cell that has a smaller coverage area than cell 210 and operates in a certain mid-band or high-band frequency. UE device 110 may present network icons (e.g., icons 202/204) that indicate to a user a current type of network service for UE device 110, where network icon 202 (i.e., "*5G") is a 5G premium network icon and where network icon 204 (i.e., "5G") is a 5G standard network icon. Assume that UE device 110 is a mobile device that moves into and out of cell 220 within the area of cell 210.

Referring to FIG. 2A, UE device 110 may be located simultaneously within cells 210 and 220. Assume UE device 110 is in an active state connected to 5G cell 220 and configured to support 5G premium service. UE device 110 may display 5G premium icon 202 while actively transmitting and/or receiving data using 5G cell 220. UE device 110 may rely on premium icon signaling 230 to determine when to display 5G premium icon 202 or another network icon (e.g., 5G standard icon 204). According to an implementation, premium icon signaling 230 may include broadcast network signals from access station 120-2 to indicate when UE device 110 (and any other UE devices 110 in cell 220) is to display 5G premium icon 202. According to another implementation, premium icon signaling 230 may include dedicated network signaling from access station 120-1, received during the active connection, to indicate when to display 5G premium icon 202.

Referring to FIG. 2B, UE device 110 may stop actively exchanging data and enter an idle state while in cell 220. According to an implementation, UE device 110 may continue to rely on premium icon signaling 230 in the form of broadcast network signals from access station 120-2 to display 5G premium icon 202 even though UE device 110 is no longer in an active state. In another implementation, instructions to continue to display 5G premium icon 202 may be provided to UE device 110 via premium icon signaling 230 in the form of dedicated network signals received from access station 120-2 during the previous active connection.

Referring to FIG. 2C, UE device 110 may enter an idle state while in cell 210 and, accordingly, display a network icon for 5G low-band service (e.g., 5G standard icon 204). While in the idle state, UE device 110 may move from overlapping cell 210 into cell 220. Thus, UE device 110 may detect broadcast signals from access station 120-2 when UE device 110 enters cell 220. According to an implementation, UE device 110 may rely on premium icon signaling 230 (e.g., in the form of broadcast network signals from access station 120-2) to determine that 5G premium icon 202 should be displayed while UE device 110 is in idle mode.

Although one 5G low-band cell 210 and one 5G premium cell 220 are shown for simplicity in FIGS. 2A-2C, in practice there may be more cells 210 and/or 220 and different amounts of 5G premium cells within and outside of each 5G low-band cell 210. For example, while FIGS. 2A-2C may correspond to a 5G standalone (SA) architecture, premium icon signaling 230 may be applied for 5G non-standalone (NSA) architectures (e.g., where cell 210 corresponds to a master cell for an LTE network and cell 220 corresponds to a secondary 5G NR cell). Additionally, 5G low-band cells 210 and 5G premium cells 220 may overlap in any combination and pattern to create areas of contiguous coverage.

Figure 3:
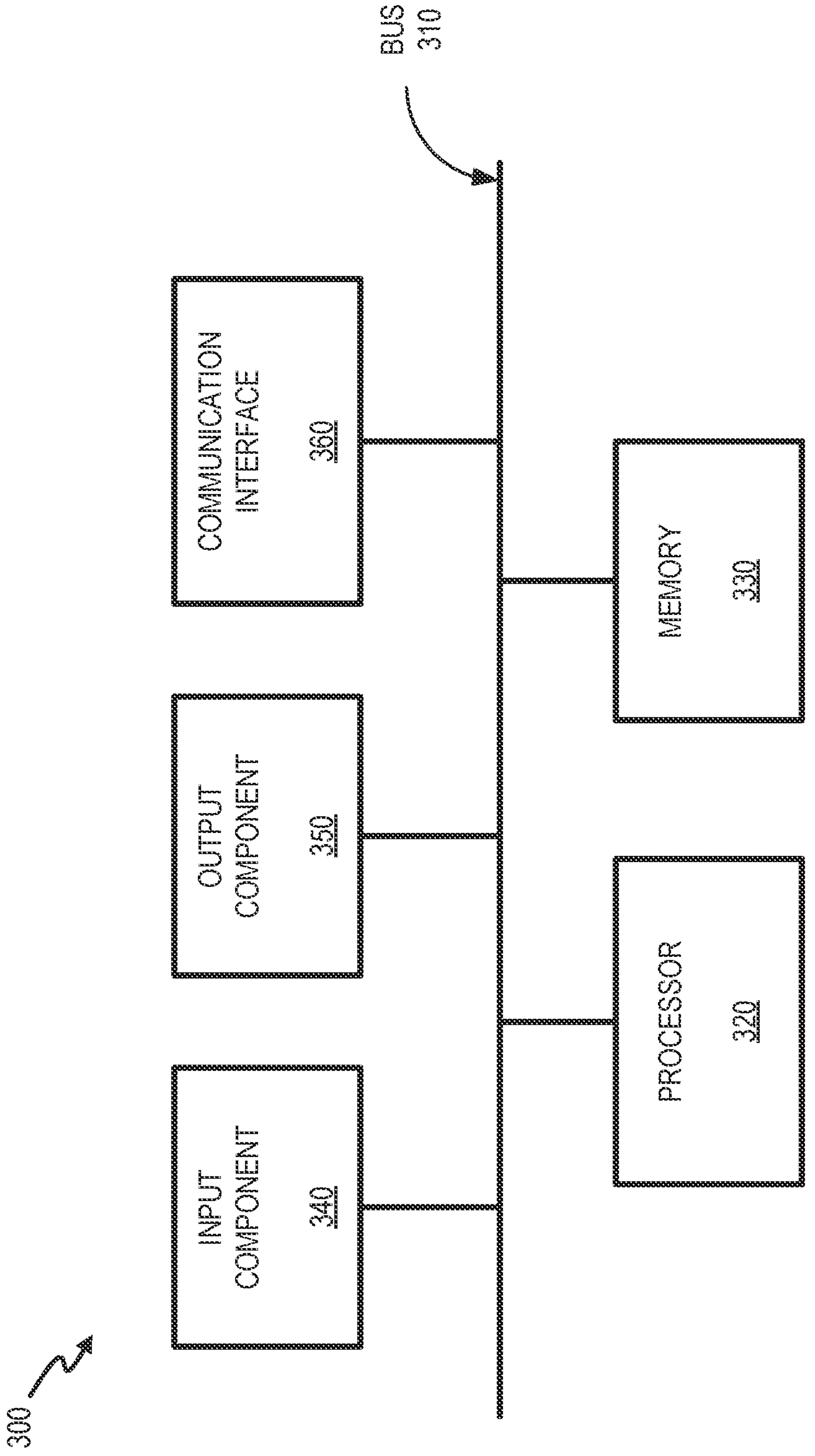
FIG. 3 is a diagram illustrating example components of a device that may correspond to one or more of the devices illustrated and described herein.

FIG. 3 illustrates example components of a device 300 according to an implementation described herein. Components of UE device 110, wireless access station 120, and network devices 150 may each include or be implemented on one or more devices 300. Device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. For example, in the context of UE device 110, output component 350 may include an icon display to selectively present network icons (e.g., network icons 202 and 204), as described herein.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively, or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Figure 4:
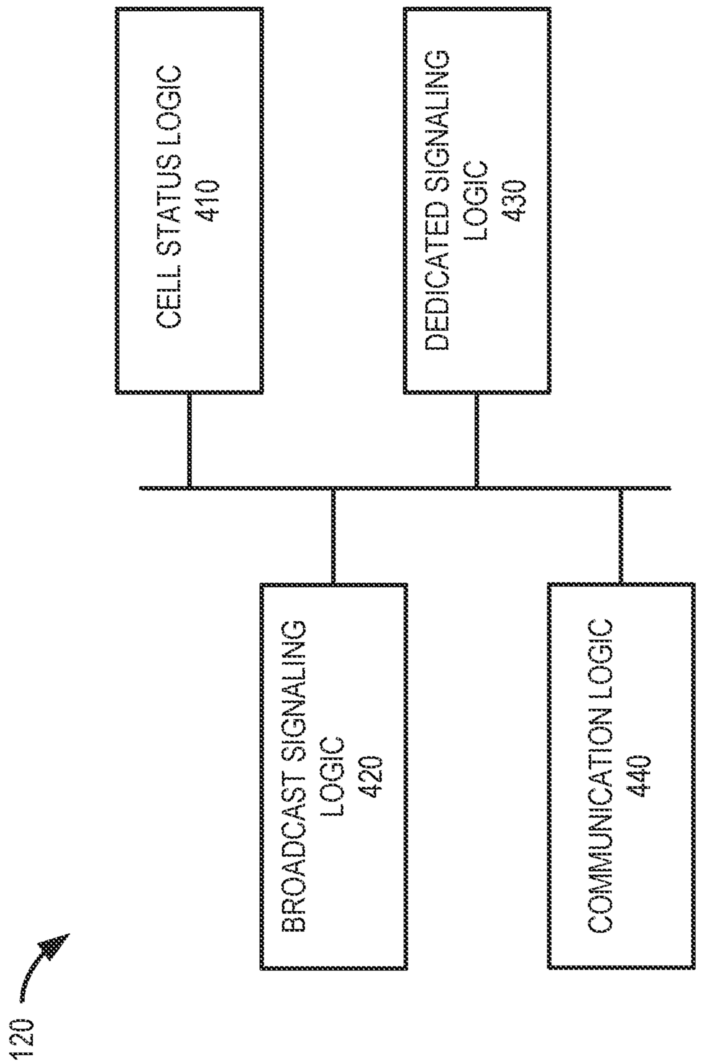
FIG. 4 is a diagram of example logical components implemented in an access station, according to an implementation.

FIG. 4 is a diagram of example logical components implemented in access station 120. In an implementation, all or some of the components illustrated in FIG. 4 may be implemented by processor 320 executing software instructions stored in memory 330. In other implementations, some or all of the components illustrated in FIG. 4 may be implemented in hardware or a combination of hardware, firmware and software used to perform the functionality described below.

Access station 120 may include cell status logic 410, broadcast signaling logic 420, dedicated signaling logic 430, and communication logic 440. In alternative implementations, these components or a portion of these components may be located externally with respect to access station 120. For example, a network device 150 in core network 140 may include logic to assist components in FIG. 4, and/or perform functions described with respect to FIG. 4.

Cell status logic 410 may monitor status of access station 120 capabilities. For example, cell status logic 410 may store static setting and dynamic conditions relating to capabilities of access station 120 to support 5G premium service. Static settings may include, for example, frequency bands, channel bandwidths, multiple-input and multiple-output (MIMO) layers on each band, carrier aggregation (CA) and dual connectivity (DC) combinations supported, etc. Dynamic conditions may include current/projected backhaul conditions (e.g., between access station 120 and core network 140) and current/projected loading conditions (e.g., 5G high-band and/or 5G mid-band wireless spectrum usage within a cell).

Broadcast signaling logic 420 may configure/generate broadcast signals for premium icon signaling 230 in the serving area (or cell) of access station 120. In one implementation, broadcast signaling logic 420 may configure a broadcast signal (herein referred to as a System Information Block 1 (SIB1)) to indicate the availability of 5G premium service. The SIB1 may include a "dummy" PLMN ID. In 5G NR SA, access station 120 (e.g., a gNB) can broadcast multiple PLMN IDs with dedicated tracking areas, RAN area codes, and cell identities for each PLMN ID. According to an implementation, the presence of a specific dummy PLMN ID (e.g., which would be used as an indicator and not be associated with a functional PLMN), when detected by a UE device 110 that is configured for 5G premium service, may cause the UE device 110 to display 5G premium icon 202.

In another implementation, broadcast signaling logic 420 may configure a broadcast signal with a dedicated SIB information element (IE) to indicate when or whether to present 5G premium icon 202. For example, the dedicated SIB IE may be added to existing wireless network standards (e.g., 3GPP standards) for implementation. The dedicated SIB IE may include a single or multiple bits that may function to indicate the availability of 5G premium service in a similar manner to the dummy PLMN ID described above (e.g., each bit or bit combination may indicate a certain 5G premium service criteria).

In another implementation, broadcast signaling logic 420 may use the presence of specific dummy PLMN IDs or dummy PLMN ID plus tracking area codes (TACs) (e.g., broadcast in SIB1) or a dedicated SIB IE to communicate criteria to UE device 110 for displaying 5G premium icon 202. For example, as illustrated in table 600 of FIG. 6, different dummy PLMN IDs broadcast by access station 120 may be applied by UE device 110 to determine UE device behavior for presenting 5G premium icon 202. FIG. 6 is described in more detail below.

According to still another implementation, broadcast signaling logic 420 may dynamically start, stop, or adjust broadcasting of a SIB1 or a dedicated SIB IE based on network conditions that impact availability of 5G premium service. For example, access station 120 may temporarily stop broadcasting a dummy PLMN ID or dedicated SIB IE when network loads are too high (e.g., above a usage level threshold) to support additional 5G premium service connections. According to an implementation, broadcast signaling logic 420 may apply configuration thresholds such as described below in connection with table 700 of FIG. 7.

Dedicated signaling logic 430 may configure/generate direct network signals associated with premium icon signaling 230, such as signals to UE devices 110 that are connected to access station 120. In one implementation, dedicated signaling logic 430 may configure a new IE in one or more Radio Resource Control (RRC) messages to indicate the availability of 5G premium service. In a standalone architecture, RRC messages that may be used to transport the new IE may include RRCSetup, RRCReconfiguration, RRCReestablishment, and RRCRelease. In a non-standalone architecture, LTE RRC messages that may be used to transport the new IE may include RRCConnectionSetup, RRCConnectionReconfiguration, RRCConnectionReestablishment, and RRCConnectionRelease. In another implementation, dedicated signaling logic 430 may configure a new type of dedicated signaling message, such as RRCOperatorDefinedConfig.

Using either the new IE or the new RRC message, dedicated signaling logic 430 may provide to a UE device 110 (*a*) an indication as to whether the 5G premium icon 202 should be displayed, (b) any criteria UE device 110 should apply to display 5G premium icon 202, and/or (c) persistence criteria. UE device 110 may include similar criteria described below in connection with table 600 of FIG. 6, such as detected bands, bandwidth, MIMO layers, CA/DC support, etc. Persistence criteria may indicate under what conditions 5G premium icon 202 should continue to be displayed, such as until new dedicated signaling is received, while in the current serving cell, while in connected mode, while in idle mode, etc.

According to still another implementation, dedicated signaling logic 430 may determine to not send the RRC IEs or RRC messages based on network conditions that impact availability of 5G premium service. For example, access station 120 may elect to not send direct signaling for 5G premium icons when network loads are too high (e.g., above a usage level threshold) to support additional 5G premium service connections. Similar to broadcast signaling logic 420 described above, dedicated signaling logic 430 may apply configuration thresholds such as described below in connection with table 700 of FIG. 7.

Communication logic 440 may include logic to communicate premium icon signaling 230 with elements in environment 100 directly or indirectly. For example, communication logic 440 may transmit broadcast communications that include dummy PLMN IDs or new SIB IEs from broadcast signaling logic 420. Additionally, communication logic 440 may transmit and receive communications associated with establishing an RRC connection with UE devices 110 and which include new IEs or the new RRC messages from dedicated signaling logic 430. Communication logic 440 may also transmit and receive communications associated with establishing a connection with another access station 120 or network device 150.

Although FIG. 4 shows exemplary logical components of access station 120, in other implementations, access station 120 may include fewer components, different components, differently arranged components, or additional components than depicted in FIG. 4. In addition, functions described as being performed by one of the components in FIG. 4 may alternatively be performed by another one or more of the components of access station 120. For example, in some cases, broadcast signaling logic 420 and dedicated signaling logic 430 may be used together. In one embodiment, broadcast signaling logic 420 may be used to signal UE devices 110 in idle mode or during initial cell acquisition, while dedicated signaling logic 430 may be used to signal UE devices 110 in connected mode.

Figure 5:
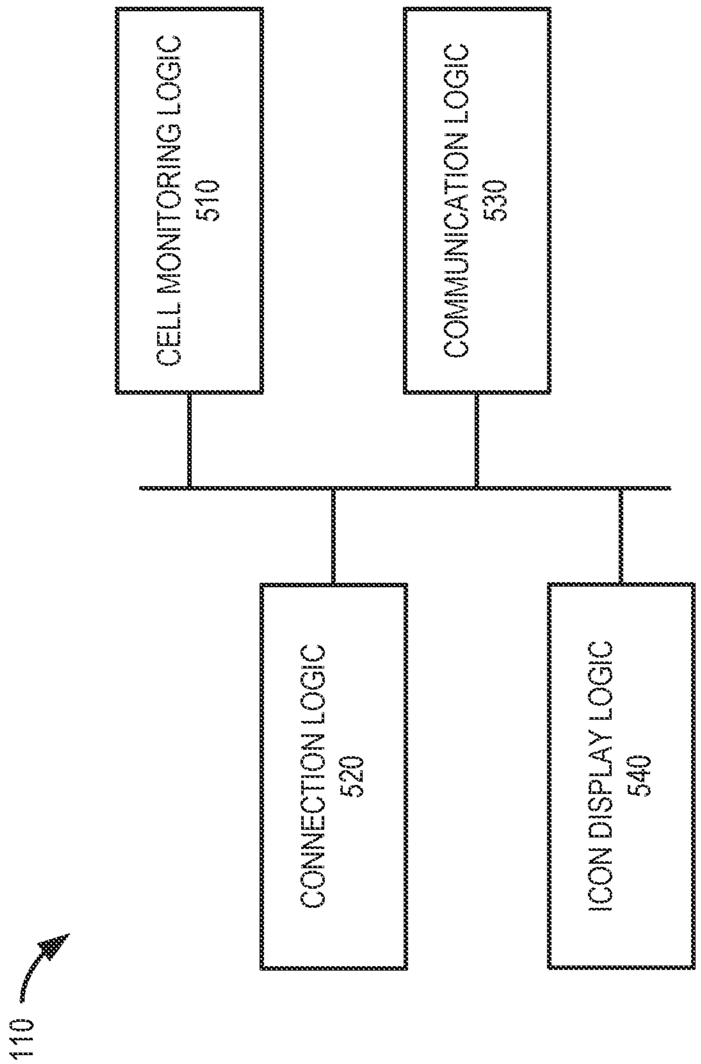
FIG. 5 is a diagram of example logical components implemented in a user equipment (UE) device, according to an implementation.

FIG. 5 is a block diagram of example logical components implemented in UE device 110. In an implementation, all or some of the components illustrated in FIG. 5 may be implemented by processor 320 executing software instructions stored in memory 330. In other implementations, some or all of the components illustrated in FIG. 5 may be implemented in hardware or a combination of hardware, firmware and software used to perform the functionality described below.

UE device 110 may include cell monitoring logic 510, connection logic 520, communication logic 530, and icon display logic 540. In alternative implementations, these components or a portion of these components may be located externally with respect to UE device 110. For example, an access station 120 or a network device 150 in core network 140 may include logic to assist components in FIG. 5.

Cell monitoring logic 510 may include logic to detect and/or monitor the signals associated with certain cells (e.g., 5G low-band cell 210, 5G premium cell 220, etc.). For example, UE device 110 illustrated in FIG. 2A may detect premium icon signaling 230 from access stations 120-2 associated with cell 220. According to an implementation, cell monitoring logic 510 may detect broadcast signals (e.g., SIB messages) from access stations 120 that may be used to indicate the availability of 5G premium coverage. For example, cell monitoring logic 510 may detect when an access station 120 within signal range broadcasts instructions from broadcast signaling logic 420 including a dummy PLMN ID via SIB1 or a new SIB IE.

Connection logic 520 may include logic to identify and interpret premium icon signaling 230, such as new IEs in RCC messages or new RRC messages, from dedicated signaling logic 430, that provide instructions for displaying 5G premium icon 202. For example, connection logic 520 may detect when an RRC message from access station 120 includes instructions for presenting 5G premium icon 202

Communication logic 530 may include logic to communicate with elements in environment 100 directly or indirectly. For example, communication logic 530 may transmit and receive communications associated with establishing an RRC connection with the appropriate access stations 120 in environment 100, such as a gNodeB (e.g., access station 120-2) that provides 5G premium service. Communication logic 530 may also transmit and receive communications associated with establishing a connection with a gNodeB (e.g., access station 120-1) that provides 5G low-band service.

Icon display logic 540 may include logic to implement display of network icons (e.g., network icons 202/204) on UE device 110. For example, icon display logic 540 may implement instructions from access stations 120 (e.g., broadcast signaling logic 420, dedicated signaling logic 430, etc.), received via cell monitoring logic 510 and/or connection logic 520, to provide the indication and/or perception of 5G premium service under certain conditions, as described herein. According to an implementation, icon display logic 540 may store and apply a set of rules, such as those summarized in FIG. 6.

Although FIG. 5 shows exemplary logical components of UE device 110, in other implementations, UE device 110 may include fewer components, different components, differently arranged components, or additional components than depicted in FIG. 5. In addition, functions described as being performed by one of the logical components in FIG. 5 may alternatively be performed by another one or more of the components of UE device 110.

FIG. 6 is a diagram of a table 600 that illustrates example 5G premium icon display rules. According to an implementation, table 600 may be stored in UE device 110 and access station 120. Table 600 include rules to govern a UE device 110 presenting a 5G premium network icon based on network instructions. For example, icon display logic 540 of UE device 110 may apply information (e.g., premium icon signaling 230) received from access station 120 to table 600 to present 5G premium icon 202. Table 600 may include a rule field 610, a network signaling field 615, a service criteria field 620, and a UE behavior field 625. As further illustrated, table 600 includes entries 690 that each includes a grouping of fields 605-625 that are correlated (e.g., a record, etc.).

Rule field 610 may provide a rule identifier and/or order of precedence for a record in table 600. Network signaling field 615 may indicate a network signal obtained from an access station 120 by UE device 110. For example, entries in network signaling field 615 may correspond to broadcast signals (e.g., a dummy PLMN ID or a SIB IE) or directed signals (e.g., an RRC message including an IE or a new RRC message) related to 5G iconography. Thus, entries in network signaling field 615 are shown as "dummy" PLMN IDs (e.g., "Dummy PLMN ID A," "Dummy PLMN ID X," etc.), which may be extracted by UE devices 110 from SIB1 broadcasts. Different PLMN IDs may correspond to different criteria for displaying a 5G premium icon. In other implementations, entries for network signaling field 615 may include bit values (e.g., one-bit or two-bit values) from SIB IEs for 5G premium icons, bit values from IEs in RCC messages, or other terms from dedicated RRC signaling messages for 5G premium icons.

As shown in the record associated with rule 5 of entries 690, a dummy PLMN ID may also include one or more dummy TACs (e.g., "TAC 0," "TAC 1") to indicate additional criteria for displaying a 5G premium icon. In the example of FIG. 6, the additional TACs may be used to indicate additional frequency bands that support 5G premium service.

Service criteria field 620 may identify a service criteria associated with a corresponding entry in network signaling field 615. For example, service criteria field 620 may indicate if one or more particular frequency bands (e.g., n77 band, n48 band, mmWave band, etc.) are needed to support 5G premium service from an access station 120 (e.g., the access station 120 that broadcasts or sends the network signal).

UE behavior field 625 may identify a behavior of UE device 110 to present a 5G premium icon. For example, UE device 110 may detect network signaling corresponding to one of the entries in network signaling field 615, identify a corresponding criteria in service criteria field 620, and present 5G premium icon 202 according to entries in behavior field 625 when the criteria is met.

FIG. 7 is a diagram of a table 700 that illustrates example configuration thresholds for 5G premium icon signaling. According to an implementation, table 700 may be stored in access station 120 and may include rules to govern when an access station 120 can provide network instructions to UE devices 110 to present a 5G premium service icon. Configuration thresholds, such as the examples in table 700, permit self-configuring icon signaling by each access station 120. For example, broadcast signaling logic 420 and/or dedicated signaling logic 430 of access station 120 may apply to table 700 information received from cell status logic 410 to generate premium icon signaling 230. Table 700 may include a parameter field 710 and a threshold field 720. As further illustrated, table 700 includes entries 790 that each includes a grouping of fields 710 and 720 that are correlated (e.g., a record, etc.).

Parameter field 710 may indicate a parameter or key performance indicator (KPI) for which a threshold is indicated. As illustrated in FIG. 7, parameters may include a frequency band, a bandwidth, MIMO layers, CA/DC support, network loading, and network backhaul. Different, additional, or fewer parameters may be used in other implementations.

Threshold field 720 may indicate a particular threshold value or definition for a corresponding parameter in parameter field 710. For example, threshold field 720 may indicate minimum values, such a minimum band support or bandwidth, needed for an access station 120 to effectively provide 5G premium service. In the example of FIG. 7, entries in threshold field 720 may define a type of radio frequency band that must to be supported by the network device, a minimum available bandwidth, a number of available multiple-input and multiple-output (MIMO) layers, a minimum number of support carrier aggregation (CA) and dual connectivity (DC) combinations, a network load percentage, and/or a minimum network backhaul level. According to an implementation, parameters/thresholds in table 700 may be configured to be applied individually or in different combinations.

In one implementation, values in table 700 may be provisioned with a common configuration for a group of access stations 120 via a provisioning system (e.g., a network device 150). In another implementation, the configuration and thresholds may be adjusted individually for a given access station using manual or push methods. Each access station 120 may dynamically apply the parameters/thresholds to determine when to signal instructions to UE devices 110 to present the 5G premium service icon. In some implementations, access stations 120 may also use advertised RRC capabilities from UE devices 110 as an additional criteria for dedicated signaling.

Figure 8:
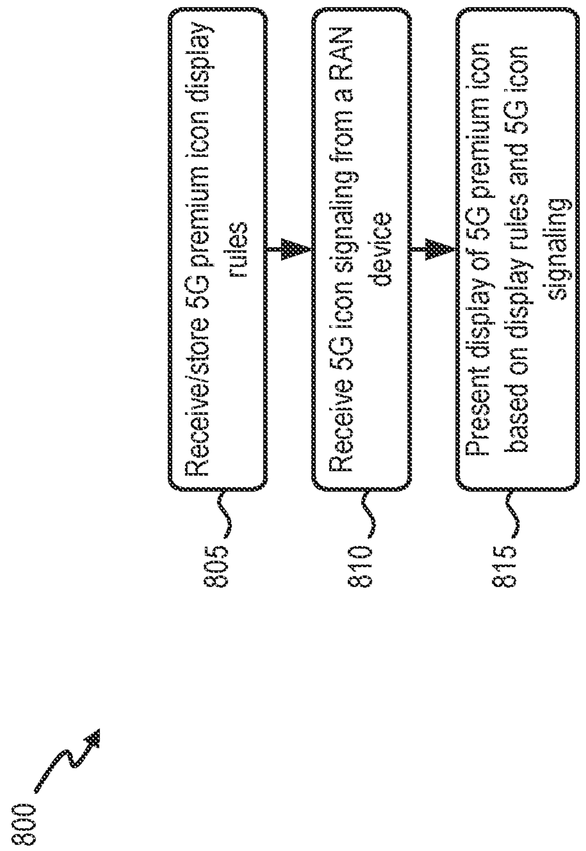
FIG. 8 is a flow diagram illustrating an example process for indicating 5G premium service coverage for UE devices in a wireless network.

FIG. 8 is a flow diagram illustrating an exemplary process 800 for indicating 5G premium service coverage for user devices in a wireless network, according to implementations described herein. In one implementation, process 800 may be implemented by UE device 110. In another implementation, process 800 may be implemented by UE device 110 in conjunction with one or more other devices in network environment 100, such as access station 120.

Referring to FIG. 8, process 800 may include receiving and/or storing 5G premium icon display rules (block 805). For example, UE device 110 may receive 5G premium icon display rules, such as the sample rules illustrated in table 600. The 5G premium icon display rules may be provided to UE device 110, for example, as part of factory provisioned software and/or a separate over-the-air software update. In one implementation, UE device 110 may store the 5G premium icon display rules in an operating system for UE device 110. In another implementation, the 5G premium icon display rules may be stored in a secure element, modem, or another memory component of UE device 110.

Process 800 may further include receiving icon signaling from a RAN device (block 810). For example, UE device 110 may receive premium icon signaling 230 from an access station 120. In one example, an access station 120 that supports 5G premium service may broadcast SIB signals that may be received by UE device 110. In one implementation, the broadcast signals may include a SIB1 with a dummy PLMN ID or a dummy PLMN ID and TACs that can be interpreted by UE device 110 as display criteria for 5G premium icon 202. In another implementation, the broadcast signals may include a new SIB IE that provides display criteria for 5G premium icon 202.

In another example, an access station 120 that supports 5G premium service may provide premium icon signaling 230 as direct signals that may be received by UE device 110. In one implementation, the direct signals may include one or more types of RRC messages that include a new IE that provides display criteria for 5G premium icon 202. In another implementation, the direct signals may include a new dedicated RRC message that provides display criteria for 5G premium icon 202.

Process 800 may also include presenting display of a 5G premium icon based on the display rules and the 5G icon signaling (block 815). For example, UE device 110 may receive the broadcast signaling or direct signaling (e.g., from access station 120) that includes criteria for displaying 5G premium icon 202. UE device 110 may apply the criteria to the display rules in, for example, table 600 to present 5G premium icon 202.

Figure 9:
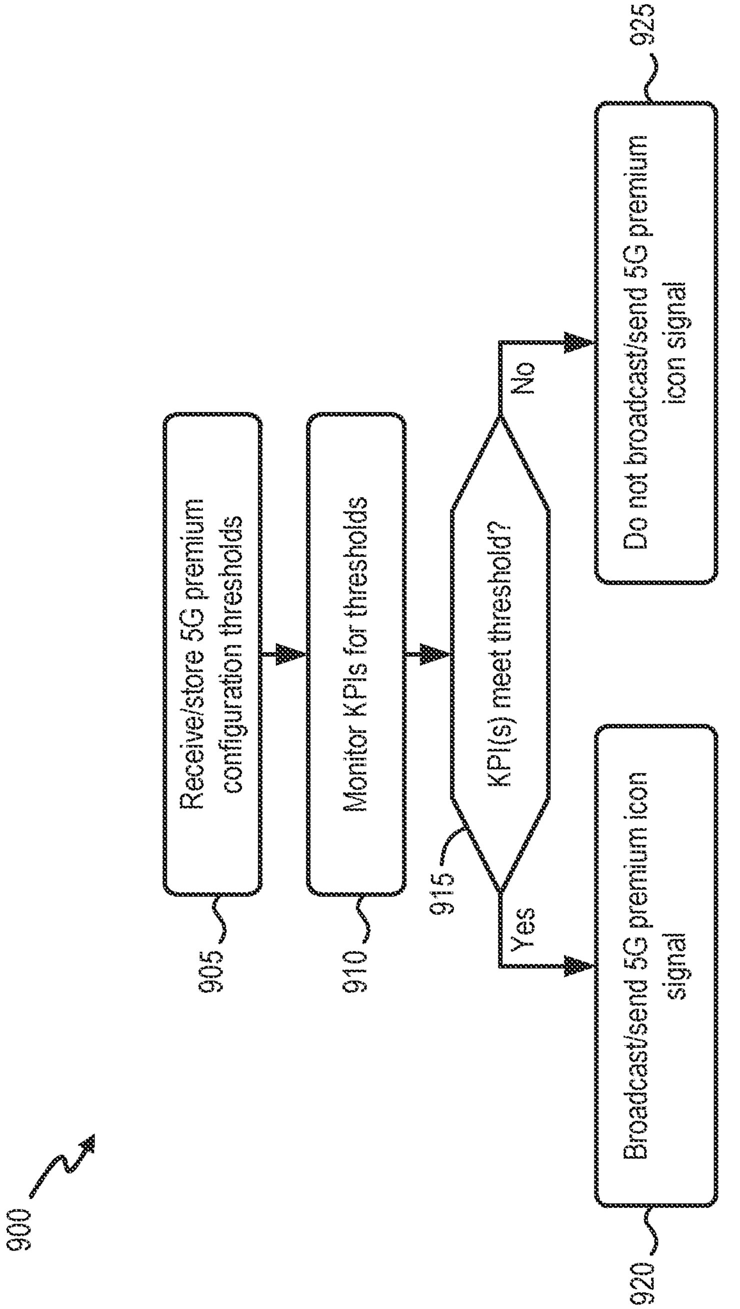
FIG. 9 is a flow diagram illustrating an example process for signaling availability of 5G premium service coverage in a wireless network.

FIG. 9 is a flow diagram illustrating an exemplary process 900 for signaling availability of 5G premium service coverage in a wireless network, according to implementations described herein. In one implementation, process 900 may be implemented by access station 120. In another implementation, process 900 may be implemented by access station 120 in conjunction with one or more other devices in network environment 100, such as network device 150.

Process 900 may include receiving and storing 5G premium configuration thresholds (block 905) and monitoring key performance indicators (KPIs) for the configuration thresholds (block 910). For example, a network device 150 may be used to provision a group of access stations 120 with a common configuration and thresholds for supporting 5G premium service, such as the sample configurations illustrated in table 700. In one implementation, each access station 120 may store the common configuration and thresholds. The thresholds may individually or in combination indicate minimum requirements for offering 5G premium service. In some implementations, the common configuration and thresholds may be individually tailored/optimized for specific access stations 120. Each access station 120 may individually monitor KPIs corresponding to the thresholds.

If the KPIs meet a threshold (block 915—Yes), process 900 may include broadcasting and/or sending a 5G premium icon signal to UE devices 110 (block 920). For example, if one or a required combination of the configuration thresholds are met at an access station 120 that supports 5G premium service, the access station may broadcast SIB signals to its respective cell. Additionally, or alternatively, an access station 120 that supports 5G premium service may provide direct signals (e.g., RRC messages with 5G premium icon signals) to certain UE devices 110 within its cell.

If the KPIs do not meet a threshold (block 915—No), process 900 may include not broadcasting and/or not sending a 5G premium icon signal to UE devices 110 (block 925). For example, if an access station 120 determines that a required combination of the configuration thresholds are not met (or predictively will not be met), access station 120 may stop broadcasting SIB signals for 5G premium icons and/or not send direct signals for 5G premium icons to connected UE devices 110.

Figure 10:
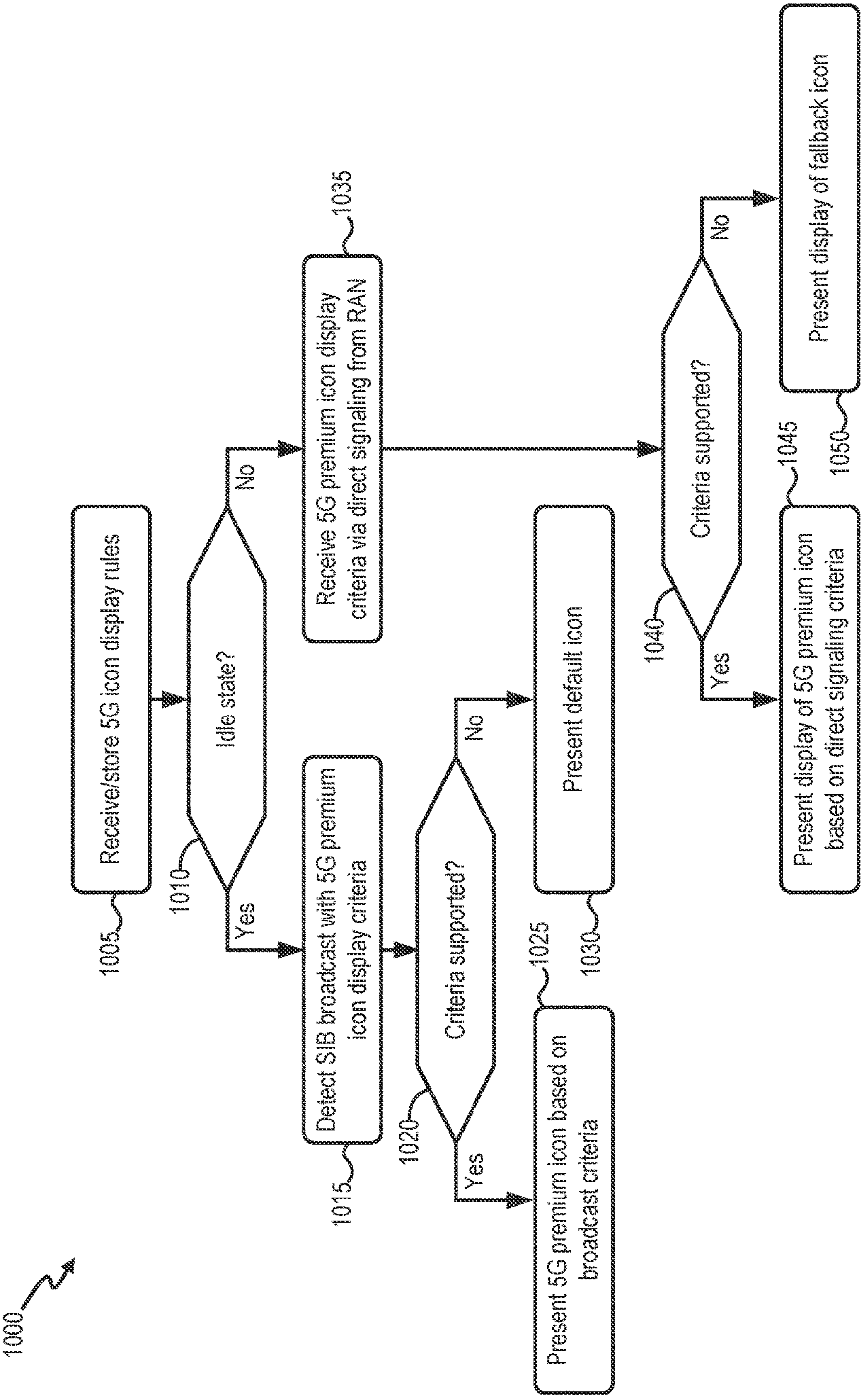
FIG. 10 is an example process for a use case where display of 5G premium icons on UE devices is managed by a network, according to an implementation described herein.

FIG. 10 is a flow diagram illustrating an exemplary process 1000 for a use case where display of 5G premium icons on UE devices 110 is managed by a network. Portions of process 1000 may be implemented by UE device 110.

Process 1000 may include receiving and storing 5G icon display criteria (block 1005) and determining whether the UE device 110 is in an idle state (block 1010). For example, UE device 110 may receive 5G premium icon display rules, such as a signal corresponding to one of the sample rules illustrated in table 600. In one implementation, the 5G premium icon display rules may be provided as part of a provisioning process or device initialization process. UE device 110 may store the 5G premium icon display rules in a local memory component.

If the UE device 110 is in an idle mode (block 1010—Yes), process 1000 may further include detecting a SIB broadcast with 5G premium icon display criteria (block 1015) and determining if the criteria is supported by the UE device 110 (block 1020). For example, UE device 110 may determine if broadcast signals for a 5G premium icon are detected. In one implementation, the broadcast signals may include a SIB1 with a dummy PLMN ID or a dummy PLMN ID and TACs that can be interpreted by UE device 110 as display criteria for 5G premium icon 202. In another implementation, the broadcast signals may include a new SIB IE that provides display criteria for 5G premium icon 202. UE device 110 may apply the criteria to determine if UE device 110 could support 5G premium service (e.g., when in an active state on the current cell).

If the criteria is supported by the UE device (block 1020—Yes), process 1000 may include presenting a 5G premium icon based on the broadcast criteria (block 1025). For example, UE device 110 may present 5G premium icon 202 to the user while in an idle state.

If the criteria is not supported by the UE device 110 (block 1020—No), process 1000 may include presenting a default icon (block 1030). For example, UE device 110 may present a 5G standard icon 204 (e.g., for SA architecture) or a 4G/LTE icon (e.g., for NSA architecture) while in an idle state.

Returning to process block 1010, if the UE device 110 is not in an idle state (block 1010—No), process 1000 may further include receiving 5G premium icon display criteria via direct signaling from a RAN (block 1035) and determining if the criteria is supported (block 1040). For example, UE device 110 may receive 5G premium icon display rules provided directly to the UE device, such as rules similar to one of the sample rules illustrated in table 600. According to an implementation, logic in UE device 110 may be configured such that the direct signals supersede any contemporaneous broadcast signals for premium icon signaling. In one implementation, the direct signals from access station 120 may include one or more types of RRC messages that include a new IE that provides display criteria for 5G premium icon 202. In another implementation, the direct signals may include a new dedicated RRC message that provides display criteria for 5G premium icon 202. UE device 110 may apply the criteria to determine if UE device 110 can currently support 5G premium service. In an active/connected state, in another implementation, UE device 110 may continue to use the broadcast signals for premium icon signaling.

If the criteria is supported by the UE device (block 1040—Yes), process 1000 may include presenting a 5G premium icon based on the direct signaling criteria (block 1045). For example, UE device 110 may present 5G premium icon 202 to the user while in an active state.

If the criteria is not supported by the UE device (block 1040—No), process 1000 may include presenting a fallback icon (block 1050). For example, UE device 110 may present a 5G standard icon 204 (e.g., for SA architecture), a 4G/LTE icon (e.g., for NSA architecture), or another network indicator while in an active state on the RAN.

The foregoing description of implementations provides illustration and description, but is not intended to be exhaustive or to limit the invention to the precise form disclosed. Modifications and variations are possible in light of the above teachings or may be acquired from practice of the invention. Also, while a series of blocks have been described with regard to FIGS. 8-10, the order of the blocks and message/operation flows may be modified in other embodiments. Further, non-dependent blocks may be performed in parallel. In addition, while particular network icons (e.g., icons 202 and 204) have been illustrated, it should be understood that other icons may be used to denote premium or non-premium service.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A network device comprising:
one or more processors configured to:
store configuration thresholds for supporting a premium cellular service;
monitor network conditions against the configuration thresholds; and
in response to determining that the network conditions meet at least one of the configuration thresholds, provide to a user equipment (UE) device a signal for the UE device to present, when the UE device is in an idle state, a premium network icon that indicates availability of the premium cellular service,
wherein the signal includes a dummy public land mobile network identifier (PLMN ID) broadcast in a system information block (SIB).

2. The network device of claim 1, wherein, when providing to the UE device the signal for the UE device to present the premium network icon, the one or more processors are further configured to:
stop providing the signal in response to determining that the network conditions do not meet the configuration thresholds.

3. The network device of claim 1, wherein, when providing to the UE device the signal for the UE device to present the premium network icon, the one or more processors are further configured to:
broadcast the dummy PLMN ID with a tracking area code (TAC).

4. The network device of claim 3, wherein the dummy PLMN ID indicates a first frequency band that supports the premium cellular service, and wherein the TAC indicates an additional frequency band that supports the premium cellular service.

5. The network device of claim 1, wherein, when monitoring the network conditions, the one or more processors are further configured to:
monitor the network conditions of a radio access network (RAN).

6. The network device of claim 5, wherein, when monitoring the network conditions, the one or more processors are further configured to monitor thresholds for:
a type of radio frequency band supported by the network device,
a minimum available bandwidth,
a number of available multiple-input and multiple-output (MIMO) layers,
a minimum number of support carrier aggregation (CA) and dual connectivity (DC) combinations,
a network load percentage, or
a minimum network backhaul level.

7. The network device of claim 1, wherein the network device includes an access station for one of a 5G standalone network or a 5G non-standalone network.

8. The network device of claim 1, wherein, when providing to the UE device the signal for the UE device to present the premium network icon, the one or more processors are further configured to:
broadcast the dummy PLMN ID to communicate first criteria to the UE device for displaying the premium network icon, or
broadcast the dummy PLMN ID to communicate second criteria to the UE device for displaying the premium network icon.

9. The network device of claim 1, wherein the configuration thresholds are individually tailored for the network device.

10. A method performed by a network device, the method comprising:
storing, in the network device, configuration thresholds for supporting a premium cellular service;
monitoring, by the network device, network conditions against the configuration thresholds; and
providing, by the network device, to a user equipment (UE) device a signal for the UE device to present, when the UE device is in an idle state, a premium network icon when the network conditions meet at least one of the configuration thresholds, wherein the premium network icon indicates availability of the premium cellular service,
wherein the signal includes a dummy public land mobile network identifier (PLMN ID) broadcast in a system information block (SIB).

11. The method of claim 10, wherein providing to the UE device the signal for the UE device to present the premium network icon further comprises:
stopping providing the signal in response to determining that the network conditions do not meet the configuration thresholds.

12. The method of claim 10, wherein providing to the UE device the signal for the UE device to present the premium network icon further comprises:
broadcast the dummy PLMN ID with a tracking area code (TAC).

13. The method of claim 12, wherein the dummy PLMN ID indicates a first frequency band that supports the premium cellular service, and wherein the TAC indicates an additional frequency band that supports the premium cellular service.

14. The method of claim 10, wherein providing to the UE device the signal for the UE device to present the premium network icon further comprises:
broadcasting the dummy PLMN ID to communicate first criteria for displaying the premium network icon, and
broadcasting the dummy PLMN ID to communicate second criteria for displaying the premium network icon.

15. The method of claim 10, wherein the configuration thresholds are individually tailored for the network device.

16. The method of claim 10, wherein monitoring the network conditions, further comprises:
monitoring the network conditions of a radio access network (RAN).

17. A non-transitory, computer-readable storage media storing instructions, which, when executed by one or more processors of a network device, cause the network device to:
store configuration thresholds for supporting a premium cellular service;
monitor network conditions against the configuration thresholds; and
when the network conditions meet at least one of the configuration thresholds, provide to a user equipment (UE) device a signal for the UE device to present, when the UE device is in an idle state, a premium network icon that indicates availability of the premium cellular service,
wherein the signal includes a dummy public land mobile network identifier (PLMN ID) broadcast in a system information block (SIB).

18. The non-transitory, computer-readable storage media of claim 17, wherein the dummy PLMN ID corresponds to criteria for displaying the premium network icon.

19. The non-transitory, computer-readable storage media of claim 17, wherein, the instructions to provide to the UE device the signal for the UE device to present a premium network icon, further comprise instructions to cause the network device to:

stop providing the signal in response to determining that the network conditions do not meet the configuration thresholds.

20. The non-transitory, computer-readable storage media of claim 17, wherein the configuration thresholds are individually tailored for the network device.

* * * * *